(No Model.) 2 Sheets—Sheet 2.
J. P. SUMMERS.
Road Scraper.
No. 239,683. Patented April 5, 1881.
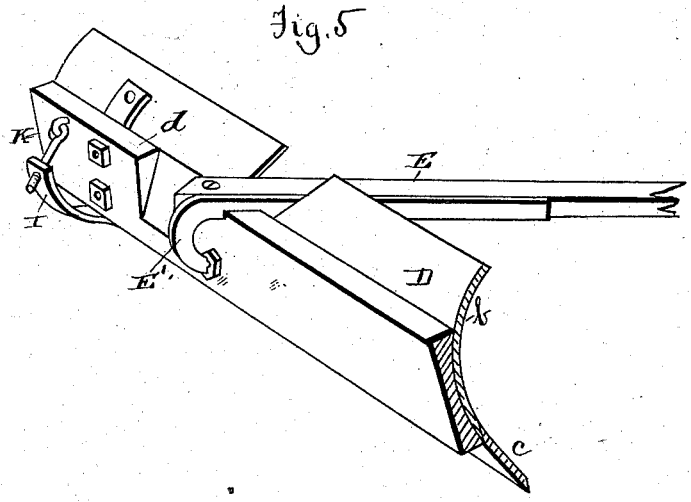
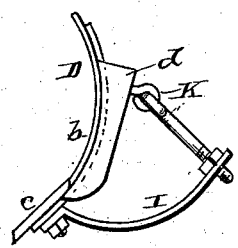
WITNESSES
A. W. Bright
Geo. D. Seymour
INVENTOR
John P. Summers,
By Leggett & Leggett,
ATTORNEYS.

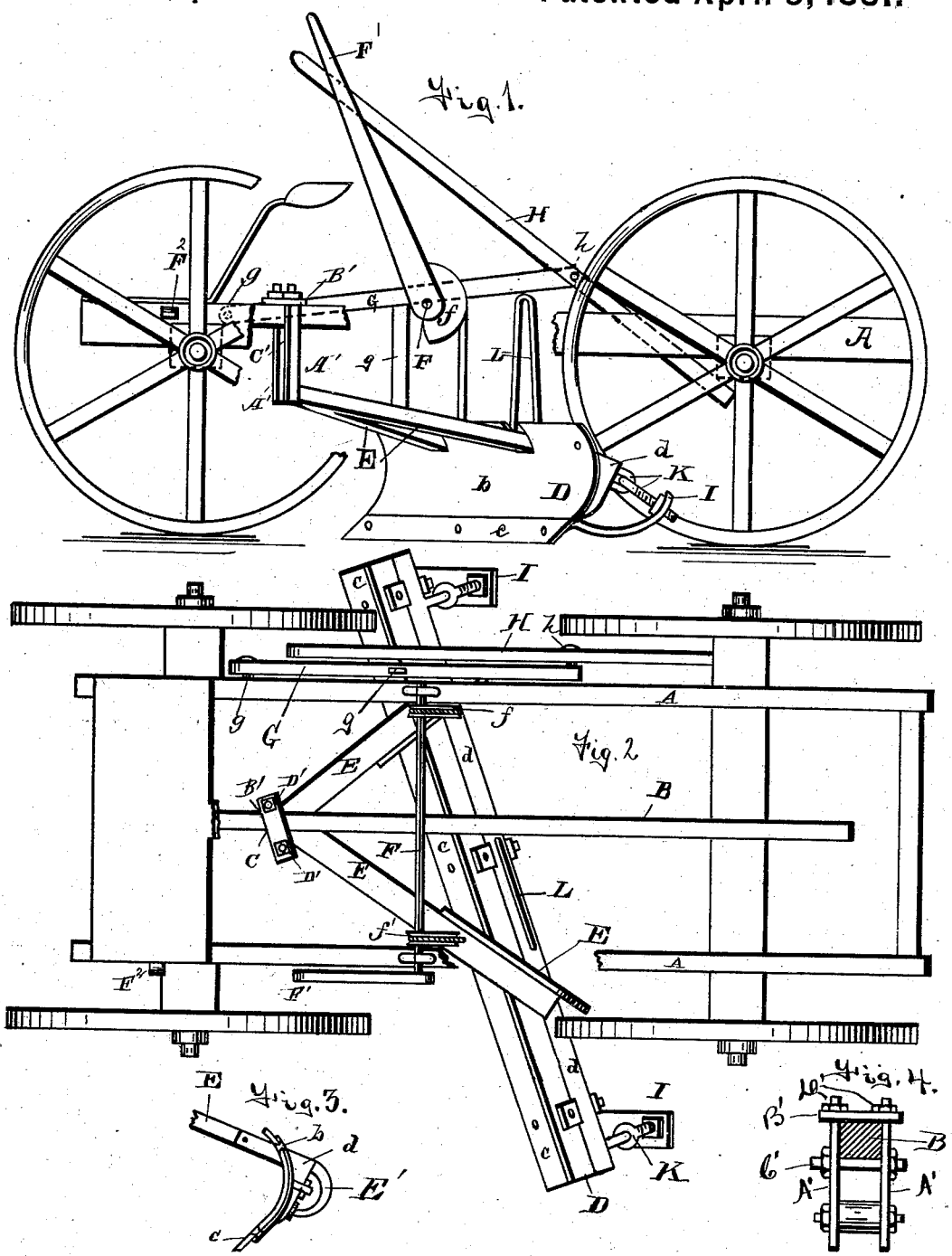

UNITED STATES PATENT OFFICE.

JOHN P. SUMMERS, OF TIFFIN, OHIO.

ROAD-SCRAPER.

SPECIFICATION forming part of Letters Patent No. 239,683, dated April 5, 1881.

Application filed May 7, 1880. (No model.)

*To all whom it may concern:*

Be it known that I, JOHN P. SUMMERS, of Tiffin, in the county of Seneca and State of Ohio, have invented certain new and useful Improvements in Road-Scrapers; and I do hereby declare the following to be a full, clear, and exact description of the invention, such as will enable others skilled in the art to which it pertains to make and use it, reference being had to the accompanying drawings, which form part of this specification.

In the drawings, Figure 1 is a view, in side elevation, of a scraper constructed according to my invention. Fig. 2 is a plan view, and Fig. 3 is a detached view, in elevation, of the scraper proper, showing its construction, and also a brace whereby it is greatly strengthened. Fig. 4 is a detached view of the coupling device, by means of which the bars of the scraper are attached to the reach of a wagon. Fig. 5 is a detail view, in rear perspective, of a portion of the scraper. Fig. 6 is a detail view, representing the scraper proper in end elevation.

In the said drawings, A represents a frame-work adapted to support the operative parts of my invention. This frame-work consists of two parallel bars of about the length of the average wagon-bed. These are placed longitudinally upon the wagon, resting upon the fore and hind bolsters. They are braced at either end by cross-pieces. In lieu of the frame-work described, an ordinary wagon-box might be used, as the strain upon this frame, or upon a wagon-box used in its stead, is very light.

B represents the ordinary reach of a wagon, by means of which the fore and hind axles are connected together. This reach fits in between the two side bars, A', and the clamping-plate B' secures it firmly between the said plate and the bolt C', the nuts D' working on the screw-threaded upper extremities of the side bars for this purpose.

C represents my attaching device, by means of which the scraper is attached to the reach.

D represents the scraper, which consists of three parts, $b\,c\,d$. The backing $d$ is preferably made of wood, and of such a form as adapts it to receive the circular metal plate $b$. The office of this circular metal plate $b$ is simply to act as a carrier, by means of which, also, the cutting-blade $c$ is widened. This cutting-blade is sharpened upon its upper and lower edges, and is attached by means of bolts provided with screws and nuts, whereby they can be readily removed and the cutting-blade reversed.

E E are arms permanently attached to the scraper, and also to the attaching device C. It is through these arms that the power is applied from the vehicle, and by means of which the scraper is drawn.

The shaft F has its extremities provided with lateral projections $f$, formed on the rear side thereof, said projections having their curved edges provided with longitudinal grooves, in which fit chains or cords, secured at their upper extremities to the shaft, and at their lower extremities to the scraper proper.

By moving the lever F' the scraper is raised from the road-bed, and at a height above the tread of the wheels of the vehicle supporting it.

When the scraper is being removed from one place to another, and when not in use as a scraper, a locking device, $F^2$, may be attached to the frame A, by means of which the lever F' is secured; but when it is desired to raise the scraper temporarily to pass a stone or other obstruction it may be operated by the hand and held until the obstruction is passed.

To one side of the frame A, I attach a device, by means of which one side of the scraper may be made to cut deeper than the other by increasing the weight upon it. This I accomplish by means of a system of levers, consisting of the lever G attached to the frame at $g$, fulcrumed at or near its center to a brace, $g'$, resting upon the scraper. The other end of this lever G is attached to the lever H at $h$. One end of this lever H passes under the rear axle, against which, when in operation, it bears. The other end of this lever H is adapted to be manipulated from the driver's seat by hand. When it is desired to cut at a greater depth upon the outside than upon any other portion of the scraper, power is applied by bearing down upon the lever H. This communicates power to the support $g'$ through the lever H to the scraper D.

To the rear surface of the cutting-bit $c$ are rigidly secured the forward ends of the curved shoes I, the rear ends of the latter being perforated for the reception of the free ends of the pivoted screw-threaded brace-rods K. The shoes are forced downward at their rear ends by means of nuts screwed onto the brace-rods K. This construction of parts provides the scraper with curved shoes, which serve to retain the scraper and cutting-bit in proper position for operation. By the use of this device the scraper can be regulated to cut any desired depth.

To the arms E, I attach braces E', preferably made of metal. These braces, as shown in Fig. 5, terminate in a curve behind the scraper, with their points bearing against the central portion thereof.

To the backing of the scraper I attach an upright, L. This consists, preferably, of a V-shaped iron, so connected with the scraper that when the same is in its proper position one of the arms of the brace L will bear against the reach of the wagon. As the scraper is set between the fore and hind wheels of the wagon at an angle, without a device of this character it would have a tendency to turn one side by the force of the soil. This upright is intended to prevent this displacement.

It will be observed that this scraper is adapted to be readily attached to the running-gear of an ordinary wagon. The only essential attachment necessary is that shown at C, Fig. 2, by means of which the arms E E' of the scraper are attached to the reach or coupling-pole of the wagon.

The office of scrapers of this character is that of taking soil from the sides of the road and ditches and delivering it at or near its center. I place my scraper at an angle with the reach or coupling-pole of a wagon to accomplish this purpose.

The operation of my device is as follows: The lever F' is locked to the frame A by means of the catch F². This, as before stated, raises the scraper from contact with the ground. The team is attached to the scraper and driven to the point where the device is intended to be used. The lever F' is released and proper adjustment made with the rods K upon the runners or shoes I to regulate the depth of cut. When the team is started the soil will be gathered the whole length of the scraper, and as it is being drawn forward at an angle will be delivered at that end of the scraper farthest removed from the forward wheels. If the other end of the scraper, cutting in the ditch, does not cut deep enough it may be forced down by pressing upon the lever H. If sufficient power is applied both the forward and hind wheels upon that side of the wagon may be raised and the whole weight borne by the scraper. When it is desired to dump, or the work is finished, the scraper may be raised from the ground by bearing upon the lever F'.

What I claim is—

1. In a road-scraper, the combination, with the cutting-bit, of the curved shoes I, rigidly secured at one end to the rear surface of the cutting-bit, the pivoted screw-threaded brace-rods K, the latter extending through perforations in the rear ends of the curved shoes, and nuts for securing the curved shoes against vertical displacement, substantially as set forth.

2. In a road-scraper, the adjusting device consisting of the shoe I and rod K, substantially as and for the purpose shown.

3. In a wheeled scraper, the combination, with a truck-reach and a clamp which embraces it, of a coupling device which depends from said clamp and connects with the draft-arms of the scraper at their point of junction, substantially as set forth.

4. In combination with a road-scraper, the levers G and H, by means of which weight is applied to one end of the scraper, substantially as and for the purpose shown.

5. In a wheeled scraper, the combination, with a scraper proper located diagonally between the fore and hind wheels, of an upright brace whose lower portion is secured to the scraper, and whose upper portion is adapted to have lateral bearing against the truck-reach, substantially as set forth.

6. In a road-scraper, the combination, with side bars, A', and reach B fitted between them, of clamping-plate B', bolt C', and nuts D', substantially as set forth.

7. In a wheeled scraper, the combination, with a scraper proper located diagonally between the fore and hind wheels, of a V-brace, secured to the backing of the scraper proper, and adapted to have one of its arms in lateral contact with the truck-reach, substantially as set forth.

In testimony whereof I have signed my name to this specification in the presence of two subscribing witnesses.

JOHN P. SUMMERS.

Witnesses:
GEO. D. LOOMIS,
A. C. BARBOUR.